No. 634,675. Patented Oct. 10, 1899.
J. T. SMITH.
FLAX BREAKING AND REDUCING MACHINE.
(Application filed May 8, 1899.)
(No Model.) 3 Sheets—Sheet 2.
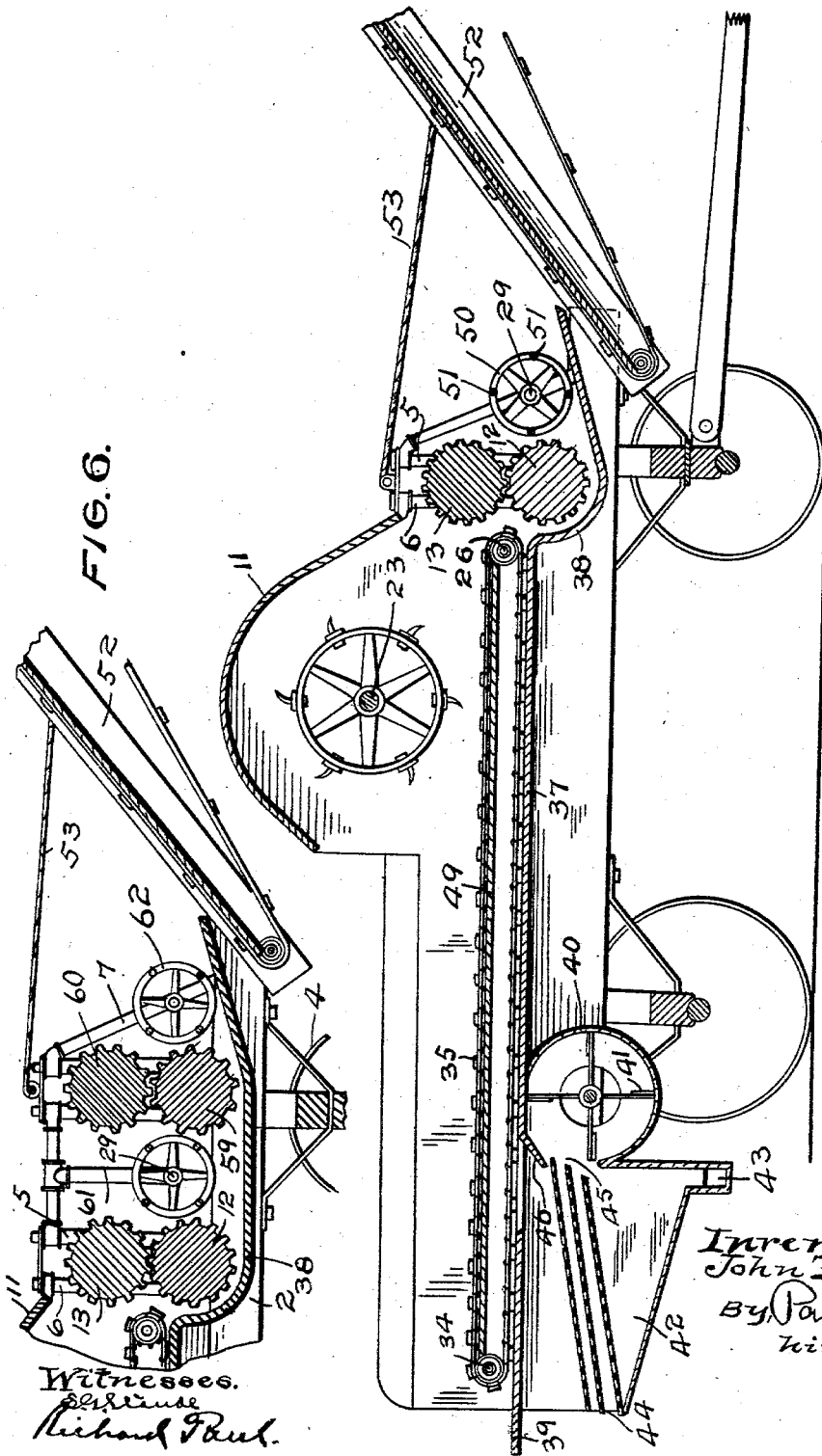
Inventor
John T. Smith.
By Paul & Hanley
his attorneys.
Witnesses.

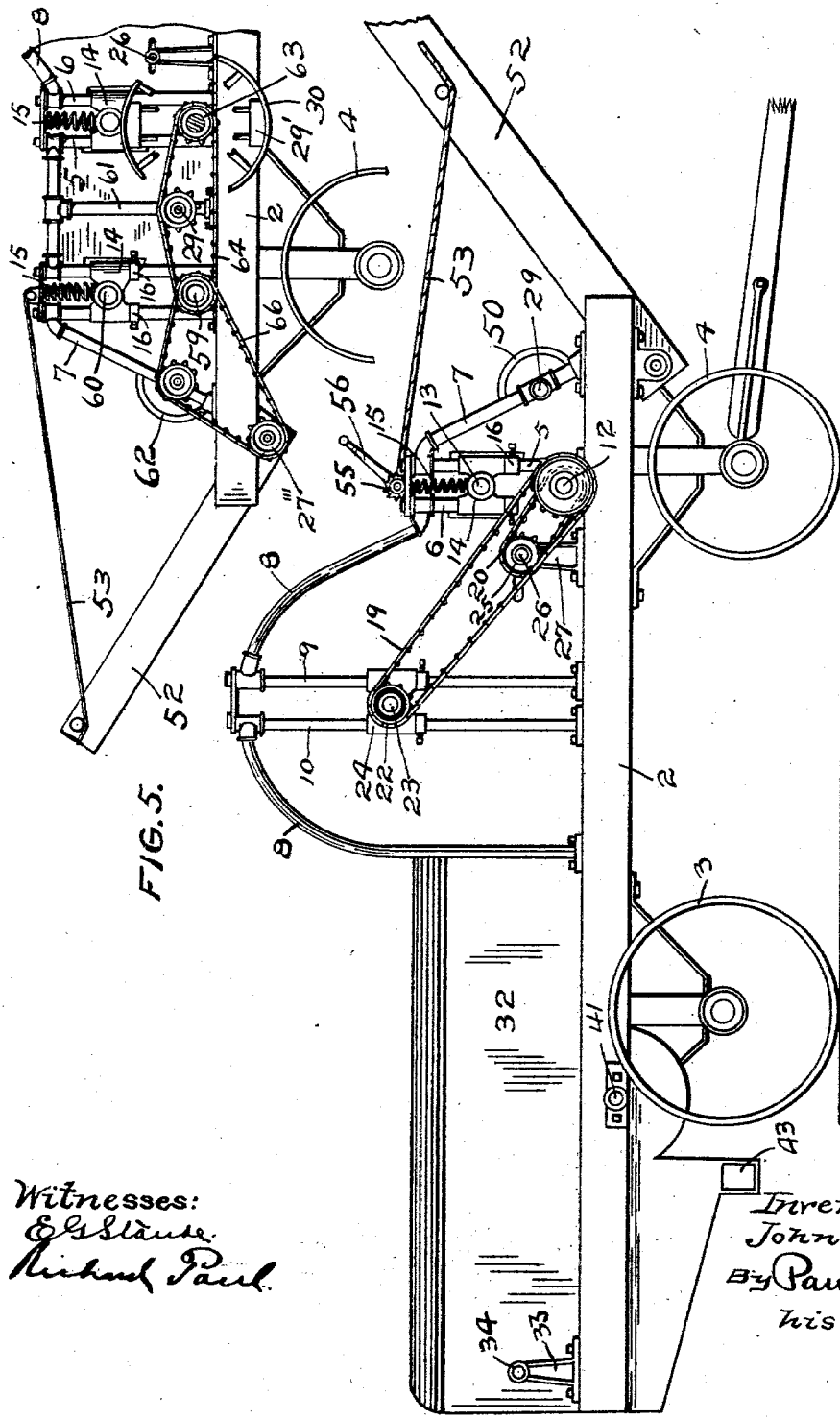

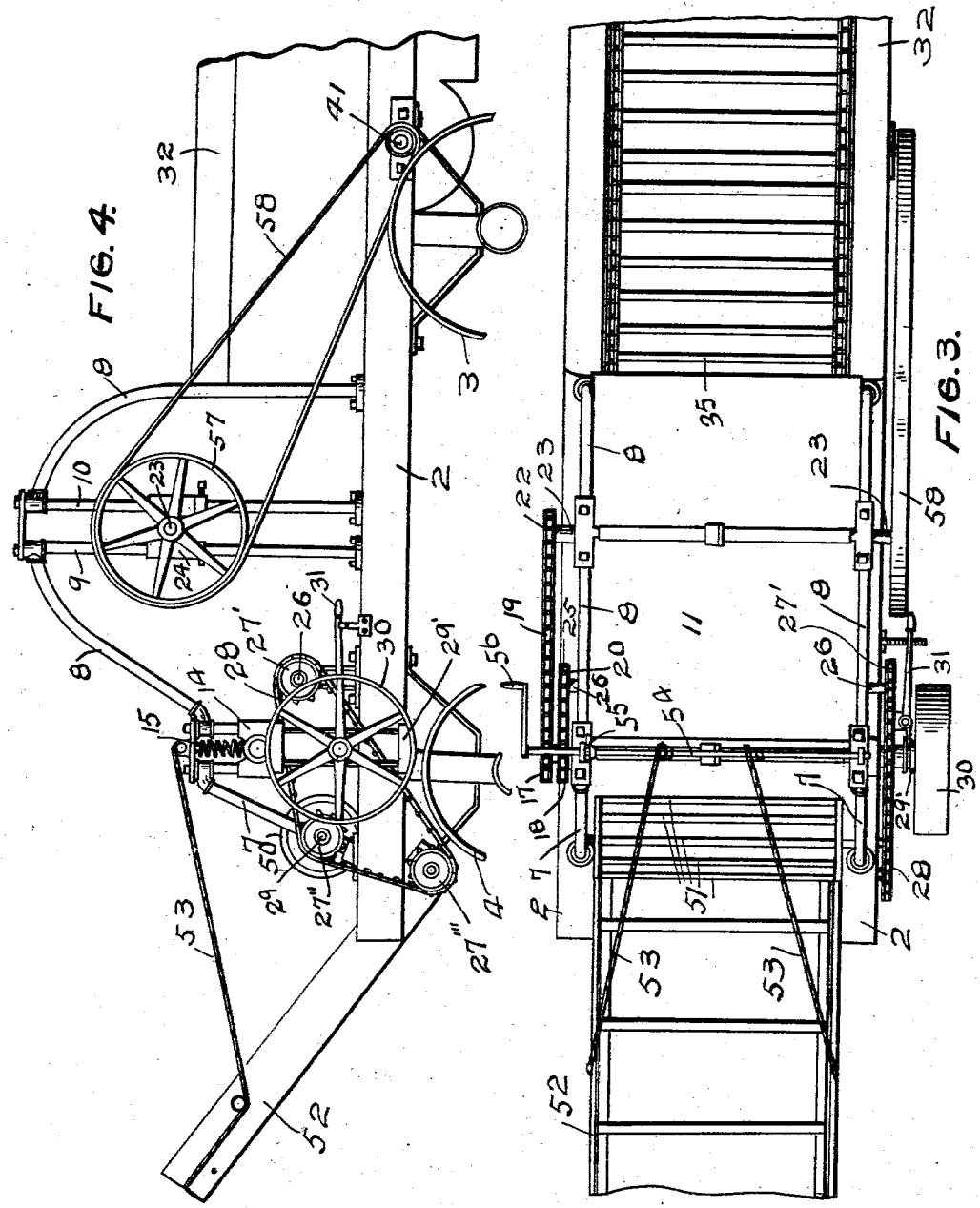

UNITED STATES PATENT OFFICE.

JOHN T. SMITH, OF HERON LAKE, MINNESOTA.

FLAX BREAKING AND REDUCING MACHINE.

SPECIFICATION forming part of Letters Patent No. 634,675, dated October 10, 1899.

Application filed May 8, 1899. Serial No. 716,000. (No model.)

*To all whom it may concern:*

Be it known that I, JOHN T. SMITH, of Heron Lake, in the county of Jackson, State of Minnesota, have invented certain new and useful Improvements in Flax Breaking and Reducing Machines, of which the following is a specification.

My invention relates to portable machines designed especially for use in the field for breaking and reducing flax, hemp, jute, or light material; and the objects of the invention are, first, to provide a portable machine adapted particularly for crushing and beating flax-straw preparatory to baling and simultaneously separating loose seeds from the straw and breaking open any pods or balls that may have passed through the threshing-machine and then collecting and cleaning the seeds, so that a considerable quantity is saved which ordinarily is wasted; second, to provide a machine that can be readily adapted for crushing hemp-straw and collecting the loose seeds that may be shaken out during the process of crushing.

The invention consists in providing an improved mechanism whereby the stock or material is given a thorough whipping or beating before it is brought to the crushing-rolls for the purpose of loosening it up, so that when it is fed to the rolls all of the straw will be broken and at the same time the seed pods or balls will be opened to permit the seeds to escape.

Further, the invention consists in providing a mechanism, in combination with the whipping and crushing devices, for gathering the seeds and loose material together and separating the same while the straw is being shaken and crushed.

Further, the invention consists in various constructions and combinations, all as hereinafter described, and particularly pointed out in the claims.

The present invention is designed as an improvement upon the invention shown and described in Letters Patent of the United States Nos. 505,069 and 511,221, issued to me September 12, 1893, and December 19, 1893.

In the accompanying drawings, forming part of this specification, Figure 1 is a side elevation of the machine embodying my invention. Fig. 2 is a longitudinal vertical section of the same. Fig. 3 is a plan view. Fig. 4 is a view similar to Fig. 1, looking at the opposite side of the machine. Fig. 5 is a side elevation of a portion of the forward end of the machine, showing a second set of crushing-rolls and beater. Fig. 6 is a longitudinal sectional view of the same.

In the drawings, 2 represents the platform of the machine, of any preferred construction, mounted upon wheels 3 and 4, whereby the machine is rendered portable and may be moved into the field and placed in any desired position. Upon the platform 2, at the forward end, I provide the upright standards 5 and 6 and the inclined braces 7, and extending back over the forward portion of the platform 2 is an arched frame 8, supporting two upright standards 9 and 10, which have their lower ends secured to the platform 2. These standards, braces, and frames are all preferably of gas-pipe, being a light, strong, and inexpensive construction. The frame 8 extends over the whipping or beating devices, hereinafter described, and a casing 11 is shown in Fig. 2 supported by said frame, and said casing may be hinged or made entirely removable or may be slotted, if preferred. Mounted in bearings between the standards 5 and 6 at the forward end of the platform is a corrugated roll or crusher 12, engaging a similar roll 13, that is mounted in bearings 14 on said standards, and while vertically movable thereon is normally held in position by springs 15. Collars 16 on said standards 5 and 6 permit the travel of said slidable bearings to be regulated. The shaft of the crusher-roll 12 on one side of the machine is provided with two sprockets 17 and 18, over which chains 19 and 20 pass, the chain 19 to a sprocket 22 on a picker-shaft 23, that is mounted on vertically-slidable bearings 24 on the standards 9 and 10, and the chain 20 to a sprocket 25 on a conveyer-shaft 26, mounted on a standard 27 at the forward end of the machine. Upon the opposite side of the machine the conveyer-shaft 26 is provided with a sprocket 27', over which a chain 28 passes to a sprocket 27'', provided on a beater-shaft 29, that is mounted in bearings in said standards or braces 7 in advance of the crusher-rolls. Said chain 28 also passes, preferably, over a sprocket 27''', provided on the conveyer-shaft that is pivoted to the forward end of the machine. The crusher-roll 12 is also provided, near the sprocket 26, with a friction-clutch 29' and a driving-pulley 30, over which a belt passes to the press or baling-machine, and by means of a lever 31 the crushing-rolls may be thrown into or out of gear at will. The platform 2 is preferably provided with side boards 32, extending back from the frame 8, and at the rear end of the platform 2 are standards 33, supporting a conveyer-shaft 34, over which an open-slatted conveyer 35 passes to the shaft 26, heretofore described. The standard whereon the shaft 26 is supported is preferably adjustable to permit the tension of the conveyer-belt to be regulated. Upon the platform 2, beneath the conveyer, I prefer to provide a floor 37, over which the slats of the conveyer sweep while the machine is running. At its forward end the floor 37 is preferably provided with a downwardly-curved extension 38, extending beneath the crushing-rolls and the beater, the forward end of said extension being upwardly turned for the purpose hereinafter described. A portion 39 of the rear end of said floor is made removable, as shown in Fig. 2, and supported upon said platform. Beneath the rear end of the conveyer is a fan-casing 40, having a fan 41, and in the rear of said fan-casing, beneath the removable portion of the floor 37, is a chamber 42, having a hopper-bottom provided with an outlet-opening 43, and in said chamber are arranged a series of sieves 44, preferably backwardly inclined from an opening 45, leading into the fan-casing. A plate 46 is preferably provided to direct material from the floor 37 upon the inclined sieves. In Fig. 2 I have shown a second floor 49, preferably removable and arranged within the machine directly beneath the upper run or leg of the conveyer to adapt the machine particularly for use in handling hemp where it is desirable to convey all the fine material to the forward end of the conveyer and then permit the conveyer to return it to the sieves rather than to have it sift down through the conveyer from above. When the machine is to be used for flax, this floor may be removed.

As heretofore described, a beater-shaft 29 is provided at the forward end of the machine, and on said shaft are heads 50, connected by a series of rods 51, forming the beaters which receive the straw after it passes through the crushing-rolls. I also prefer to provide at the forward end of the machine a conveyer 52, hinged at one end to the forward end of the machine and elevated to the desired angle by a rope 53, that is connected to a windlass 54, supported on the standards 5 and 6, and having a ratchet 55 and a crank 56 for locking and operating the same.

As shown in Fig. 4, I prefer to provide a pulley 57 on the end of the picker-shaft, from which the fan 41 is driven by a belt 58.

In Figs. 5 and 6 I have shown the forward end of the machine provided with a second set of crushing-rolls and beater. The construction of the machine shown in these figures is substantially the same, except that the platform 2 is a little longer and the plate or bottom 38 is extended forward beneath the forward set of crushing-rolls. This forward set of rolls 59 and 60 is mounted in bearings similar to those supporting the rear set, and the beater-shaft 29 is mounted in bearings in an upright standard 61 between the forward and rear sets of rolls, and the forward beater 62 is mounted on the inclined braces 7, which in this construction are placed in front of the forward set of rolls. The double set of rolls is used when it is desired to produce a better quality of tow, the first break when the straw passes through the first set of rolls producing a coarse grade and the second set of crushing-rolls making a finer break and producing a better quality of tow. For driving this second set of rolls I prefer to provide a sprocket 63 on the shaft of the crushing-roll 12 and a chain 64, passing over sprockets on the shafts of the rear beater and the forward crushing-roll 59, and the forward beater and the inclined conveyer are driven by a chain 66, passing over sprockets on the shaft of said crusher-roll 59 and said forward beater and conveyer.

The operation of my machine is as follows: The flax-straw, being thrown on the conveyer 35, is carried along beneath the picker, caught up by it and whipped and thoroughly separated, and finally thrown down upon the conveyer in position to be engaged by the crushing-rolls. After passing through the rolls, by which the straw is thoroughly crushed and the seed pods or balls broken, the straw is engaged by the beater and thoroughly beaten and then delivered to the conveyer. During this process the seeds and fine materials that are beaten out of the straw and fall upon the floor beneath the conveyer are swept back by it to the sieves, and the seeds that are separated by the crushing-rolls and beater collect on the floor 38 and are gathered up by the lower crushing-roll and delivered to the conveyer to be swept along the floor 37 to the sieves. During the process of crushing the straw and separating the seeds the fan attachment is cleaning the fine material deposited on the sieves by the conveyer, so that while the crushed straw passes out at the forward end of the machine to the baling-press the seeds that have been saved pass out of the rear end of the machine into a suitable receptacle provided beneath the chamber 42.

Obviously various modifications may be devised of the method I employ for driving the crushing-rolls, the conveyer, and picker-shaft, and I therefore do not confine myself to the form of driving mechanism shown. In various other respects the mechanism of my invention may be modified without, however, departing from the spirit of my invention.

Having thus described my invention, I claim as new and desire to secure by Letters Patent—

1. The combination, in a machine of the class described, with a platform having a close bottom or floor, of a conveyer having its lower portion adapted to sweep over said floor, a picker arranged above said conveyer to pick up and toss the material thereon, crushing-rolls arranged in position to receive the material from said picker and to crush the straw and separate the seeds and fine material therefrom, a plate or bottom provided beneath said crushing-rolls and whereon the seeds separated thereby fall to be gathered up by the lower crushing-roll and delivered to the conveyer, and a fanning mechanism provided near said conveyer and operating in connection with said crushing devices to screen and separate the seeds and fine material delivered by said conveyer, substantially as described.

2. In a machine of the class described, the combination, with a closed floor or platform, of a conveyer having its lower portion adapted to sweep over the same and to convey the seeds and fine material delivered thereto by the crushing-rolls to the rear end of the machine, crushing-rolls mounted in bearings near the forward end of said conveyer to crush the straw and separate the seeds and fine material therefrom, a beater arranged near said crushing-rolls to thoroughly beat the material after it passes through said rolls, and a fanning mechanism provided near the rear end of said conveyer to receive the seeds and fine foreign material therefrom, for the purpose specified.

3. In a machine of the class described, the combination, with a platform having a closed floor, of a conveyer having its lower portion adapted to sweep over the same and convey the seeds and fine material from the crushing-rolls back to the rear end of the machine, a picker arranged over said conveyer, crushing-rolls to receive the material from said picker and crush the seed-balls and separate the seeds therefrom, and a fanning or screening mechanism provided near the rear end of said conveyer and operating in connection with said conveyer and crushing-rolls and to which the seeds and fine material are delivered by said conveyer to be separated, substantially as described.

4. In a machine of the class described, the combination, with a platform having a close bottom, of a conveyer having its lower portion adapted to sweep over said close bottom or floor, a second bottom or floor arranged between the upper and lower portions of said conveyer, crushing-rolls provided near said conveyer to receive the material therefrom and to deliver the seeds and fine material separated by said rolls and the lower or returning portion of said conveyer, and a fanning or screening mechanism provided near the rear end of said conveyer and operating simultaneously with said conveyer and crushing-rolls and to which the seeds and fine material are delivered by said conveyer to be separated, substantially as described.

5. In a machine of the class described, the combination, with a platform 2, of an open-slatted conveyer having its lower portion adapted to sweep over the close floor of said platform, a picker arranged above said conveyer to pick up and toss the material thereon, crushing-rolls to receive the material from said picker and adapted to crush the straw and break the seed pods and balls, a beater to receive the material from said crushing-rolls to shake and beat the seeds and fine particles therefrom, a plate 38 beneath said crushing-rolls and said beater to receive the seeds and fine material from whence it is removed and delivered to said conveyer by the lower crushing-roll, and a series of sieves at the rear end of the machine to receive the seeds and fine material from said conveyer, substantially as described.

6. In a machine of the class described, the combination, with a platform having a close bottom, of a conveyer having its lower portion adapted to sweep over the same, a picker arranged above said conveyer and adapted to pick up and toss the material thereon, crushing-rolls arranged to receive the material from said picker and to crush the straw and break open the seed pods and balls, a beater to receive the crushed material from said rolls, a second set of rolls to receive the material from said beater, a second beater to receive the material from said second rolls and deliver it to a conveyer, and a plate or floor 38 provided beneath said rolls and said beaters and whereon the seeds and fine material fall to be gathered up by the lower of the first set of crushing-rolls and delivered to said conveyer and swept to the rear of the machine to be cleaned, substantially as described.

In witness whereof I have hereunto set my hand this 29th day of April, 1899.

JOHN T. SMITH.

In presence of—
RICHARD PAUL,
M. C. NOONAN.